(12) United States Patent
Takabayashi (10) Patent No.: US 7,893,126 B2
(45) Date of Patent: Feb. 22, 2011

(54) ACTIVE RAY CURABLE INK-JET INK, IMAGE FORMING METHOD AND INK-JET RECORDING APPARATUS

(75) Inventor: Toshiyuki Takabayashi, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 641 days.

(21) Appl. No.: 11/978,516

(22) Filed: Oct. 29, 2007

(65) Prior Publication Data

US 2008/0105162 A1 May 8, 2008

(30) Foreign Application Priority Data

Nov. 7, 2006 (JP) ............................ 2006-301334

(51) Int. Cl.
*C08F 2/50* (2006.01)
*C08F 2/46* (2006.01)
*C08J 3/28* (2006.01)
*C09D 11/02* (2006.01)
*C09D 11/12* (2006.01)

(52) U.S. Cl. ............................ 522/78; 522/31; 522/49; 522/71; 522/74; 522/79; 522/81; 522/170; 522/168; 106/31.13; 106/31.6

(58) Field of Classification Search .................. 522/31, 522/49, 71, 74, 81, 78, 79.17, 168; 106/31.13, 106/31.6
See application file for complete search history.

(56) References Cited

U.S. PATENT DOCUMENTS 6,332,943 B1 * 12/2001 Herrmann et al. ........... 156/277

FOREIGN PATENT DOCUMENTS

| DE | 1936311 | B | * | 12/1970 |
| FR | 2048418 | A | * | 3/1971 |
| JP | 2002-188025 | A | | 7/2002 |
| JP | 2003-341217 | A | | 12/2003 |
| JP | 2004-002668 | A | | 1/2004 |
| JP | 2005-113043 | A | | 4/2005 |
| JP | 2006-037021 | A | | 2/2006 |

OTHER PUBLICATIONS

Ajinomoto Fine-Techno Co. Inc. Product Sheet for AJISPER pigment dispersing agents. (2008). [online]. [retrieved online Jun. 3, 2010]. Retrieved from Internet :<URL:http://www.aft-website.com/en/products/08/>.*

Ajinomoto Fine-Techno Co. Inc. Product Sheet for PB-822 AJIsupa pigment dispersing agents. (2008). [online]. [retrieved online Jun. 3, 2010]. Retrieved from Internet :<URL:http://translate.googleusercontent.com/translate_c?hl=en&sl=ja&u=http://www.aft-website.com/en/products/08/>.*

* cited by examiner

*Primary Examiner*—Sanza L McClendon
(74) *Attorney, Agent, or Firm*—Holtz, Holtz, Goodman & Chick, P.C.

(57) ABSTRACT

An active ray curable ink-jet ink comprising at least one type of a photo acid generating compound, a cationic polymerizable compound and a pigment, wherein the active ray curable ink-jet ink contains a fatty acid amine salt comprising a fatty acid having a carbon number of 6-18 and a primary, a secondary or a tertiary amine having a carbon number of 4-12 in an amount of 0.01-0.70 weight % based on the total weight of the ink-jet ink.

7 Claims, 2 Drawing Sheets

FIG. 1

FIG. 2 ical circuit
ACTIVE RAY CURABLE INK-JET INK, IMAGE FORMING METHOD AND INK-JET RECORDING APPARATUS This application is based on Japanese Patent Application No. 2006-301334 filed on Nov. 7, 2006, in Japanese Patent Office, the entire content of which is hereby incorporated by reference.

FIELD OF THE INVENTION

The present invention relates to an active ray curable ink-jet ink, and an image forming method, as well as an ink-jet recording apparatus which utilize that ink-jet ink.

BACKGROUND OF THE INVENTION

Heretofore, an active ray curable composition, which is cured by active energy rays such as ultraviolet rays and electron rays, is utilized in practice for various applications such as paints, adhesives and printing ink on such as plastics, paper, woodwork and inorganic materials, a printed circuit board and electric insulation related matters.

Further, as an ink system via ink-jet image formation utilizing these polymerizable compositions, there are known ultraviolet curable ink-jet inks which are cured via ultraviolet rays, and an ink-jet method utilizing this ultraviolet curable ink has attracted attention in recent years with respect to quite rapid drying and recording capability on a non-ink-absorptive recording medium. However, ultraviolet curable ink-jet ink, which contains a pigment (in a dispersion), a photo-initiator and a polymerizable compound, is not stably ejected over a long duration due to problems such as precipitation of the initiator and dispersing agent, as well as a problem of gelation of a polymerizable compound, making it almost impossible to continuously and stably form highly precise images.

Further, ink utilizing a cationic polymerizable compound is easily affected by water content (moisture) at the molecular level, making it difficult to eject the ink stably over a long duration in varying environments (such as temperature and humidity), (please refer, for example, to Patent Documents 1-3).

Further, disclosed has been a technology to utilize a basic compound in ink (for example, please refer to Patent Document 4), however, that technology exhibited problems such as insufficient photo-curing and easy generation of abrasion marks on the printed matter due to softness of the cured layer when an amine compound is simply utilized to maintain ejection stability. Further, a technology to utilize quaternary ammonium salt in the ink has been disclosed (for example, please refer to Patent Document 5), however, the technology exhibited the problem in which it was impossible to maintain stable ejection over a long duration and a large amount of added quaternary ammonium salt is required (as much as approximately 1.0 weight % of the ink) to cause precipitation upon cooling at such as −20° C. in the case of utilizing a quaternary ammonium salt, which is referred to being preferable in the literature and is utilized also in the examples.

[Patent Document 1] Unexamined Japanese Patent Application Publication No. (hereinafter, referred to as JP-A) 2002-188025

[Patent Document 2] JP-A 2005-113043

[Patent Document 3] JP-A 2006-37021

[Patent Document 4] JP-A 2003-341217

[Patent Document 5] JP-A 2004-2668

SUMMARY OF THE INVENTION

Problems to be Solved

An object of this invention is to provide an active ray curable ink-jet ink which is superior in ejection stability when utilized over a long duration under varying-environments (i.e. temperature and humidity) as well as exhibiting excellent curing capability; and an image forming method and an ink-jet recording apparatus, which utilize the ink-jet ink.

Means to Solve the Problems

The above-described object was achieved via the following constitutions.

Item 1. An active ray curable ink-jet ink comprising at least one type of a photo acid generating compound, a cationic polymerizable compound and a pigment,
wherein the active ray curable ink-jet ink contains a fatty acid amine salt comprising a fatty acid having a carbon number of 6-18 and a primary, a secondary or a tertiary amine having a carbon number of 4-12 in an amount of 0.01-0.70 weight % based on the total weight of the ink-jet ink.

Item 2. The active ray curable ink-jet ink described in Item 1 above, wherein the fatty acid, having a carbon number of 6-18, is an unsaturated fatty acid having a carbon number of 6-18.

Item 3. The active ray curable ink-jet ink described in Item 1 or 2 above, wherein the primary, the secondary or the tertiary amine, having a carbon number of 4-12, is a primary, a secondary or a tertiary alkanol amine having a carbon number of 4-12.

Item 4. The active ray curable ink-jet ink described in any one of Items 1-3 above, wherein a content of the fatty acid amine salt is 0.01-0.50 weight % based on the total weight of the ink-jet ink.

Item 5. The active ray curable ink-jet ink described in any one of Items 1-4 above, wherein the ink-jet ink contains at least one monomer, as the cationic polymerizable compound, selected from the group consisting of an epoxy compound, a vinyl ether compound and an oxetane compound, and further contains at least one type of mono-functional monomer in an amount of 10-30 weight % based on the total weight of the ink-jet ink.

Item 6. The active ray curable ink-jet ink described in any one of Items 1-5 above, wherein viscosity of the ink-jet ink at 25° C. is 7-100 mPa·s.

Item 7. An image forming method comprising the steps of:
(i) ejecting the active ray curable ink-jet ink described in any one of Items 1-6 onto a recording medium from an ink-jet recording head, and
(ii) curing the ejected ink-jet ink to form an image on the recording medium,
wherein the image is formed by ejecting the active ray curable ink-jet ink from a recording head of a line head method.

Item 8. An ink-jet recording apparatus to perform image formation utilizing the active ray curable ink-jet ink described in any one of Items 1-6, wherein ink ejection is performed after the active ray curable ink-jet ink and a recording head have been heated at 35-100° C.

DESCRIPTION OF SYMBOLS

1: Ink-jet recording apparatus
2: Head carriage
3: Ink-jet recording head
31: Ink ejection outlet
4: Irradiation means
5: Platen portion
6: Guide members
7: Bellows structure
P: Recording medium Effects of the Invention This invention is able to provide an active ray curable ink which is superior in ejection stability when utilized over a long duration under varying environments (such as temperature and humidity) as well as being excellent in curing capability; and an image forming method and an ink-jet recording apparatus which utilize the ink-jet ink.

DETAILED DESCRIPTION OF THE INVENTION

In the following paragraphs, this invention will be detailed.

The inventors of this invention have found that a problem of ejection stability in active ray curable ink, which has been conventionally a problem, can be effectively overcome by utilizing a fatty acid amine salt comprising a fatty acid having a carbon number of 6-18, as well as a primary, a secondary or a tertiary amine having a carbon number of 4-12 in a cationic polymerizable active ray curable ink-jet ink.

Herein, "fatty acid" refers to a compound having a form in which hydrogen atoms of an aliphatic hydrocarbon (including saturated or unsaturated hydrocarbons) are substituted by carboxyl groups, and those having carboxyl group numbers in a molecule of 1, 2, 3 and 4 are called as a monocarboxylic acid, a dicarboxylic acid, a tricarboxylic acid and a tetracarboxylic acid, respectively. Further, "fatty acid" means an aliphatic monocarboxylic acid and includes saturated fatty acid and unsaturated fatty acids.

Herein, the fatty acid amine salt can be prepared by mixing equivalent moles of an amine corresponding to the number of carboxylic acid of a fatty acid and stirring at 60-80° C. for 30 minutes to 2 hours.

As a material to constitute the main body and/or interior of an ink-jet recording head, a metal (or an alloy) such as stainless steel and aluminum is generally utilized with respect to durability and ease of processing. For example, in the interior of an ink-jet recording head, a filter is installed in the ink flow path to remove foreign matter in the ink and to prevent clogging, and further a metal (or an alloy) is also generally utilized as a member to form these filters.

It has been found that precipitation will result due to local galvanic reaction in the ink to induce poor ejection due to clogging of the ink flow path, as well as clogging of nozzle orifices when a state of cationic polymerizable active ray curable ink-jet ink being in contact with the metal (or alloy) continues over a long duration.

The constitution of this invention is epoch-making and enables remarkable reduction of galvanic reaction in cationic polymerizable active ray curable ink-jet ink, and ensures ejection stability as well as fast curing capability, even in long periods of usage.

In the active ray curable ink-jet ink of this invention, a fatty acid amine salt, comprising a fatty acid having a carbon number of 6-18, and an amine having a carbon number of 4-12 is utilized. When the carbon number of the utilized fatty acid is less than 6 and the carbon number of the utilized amine is less than 4, volatility is excessive causing unpleasant odor which is problematic due to causing a harmful working environment; while when the carbon number of the utilized fatty acid is over 18 or the carbon number of the utilized amine is over 12, the targeted effect on ejection stability, which is an object of this invention, is too little and is insufficient in both cases. A more preferable range of the carbon number of the fatty acid is 9-16, and the carbon number of the amine being 6-10.

Preferable specific examples of a fatty acid having a carbon number of 6-18 utilized in this invention include a saturated fatty acid such as straight-chain or branched-chain hexanoic acid, straight-chain or branched-chain heptanoic acid, straight-chain or branched-chain octanoic acid, straight-chain or branched-chain decanoic acid, straight-chain or branched-chain undecanoic acid, straight-chain or branched-chain dodecanoic acid, straight-chain or branched-chain tridecanoic acid, straight-chain or branched-chain tetradecanoic acid, straight-chain or branched-chain pentadecanoic acid, straight-chain or branched-chain hexadecanoic acid, straight-chain or branched-chain heptadecanoic acid and straight-chain or branched-chain octadecanoic acid; unsaturated fatty acid such as myristoleic acid, palmitoleic acid, oleic acid, elaidic acid, vaccenic acid and linoleic acid; and mixtures thereof; however the saturated fatty acids are not limited thereto.

Further, as a fatty acid utilized in this invention, an unsaturated fatty acid having a carbon number of 6-18 is more preferably incorporated with respect to the larger desirable effect on ejection stability.

Preferable specific examples of the primary, the secondary or the tertiary amine utilized in this invention include alkanolamine such as triethanolamine, diisopropanolamine, triisopropanolamine and 2-N-(2-aminoethyl)ethanolamine; cyclopentylamine; cyclohexylamine; cycloheptylamine; dicyclohexylamine; 1,3-bisaminomethyl cyclohexane; methaxylenediamine; laurylamine; oleylamine and mixtures thereof; however the examples are not limited thereto.

Further, as an amine utilized in this invention, the primary, the secondary or the tertiary alkanolamine having a carbon number of 6-14 is preferably incorporated with respect to greater desired effect on ejection stability. Herein, an alkanolamine is a general name of a saturated aliphatic amine having a hydroxyl group in its molecule.

In this invention, the content of a fatty acid amine salt in the ink is 0.01-0.70 weight %, while sufficient curing capability cannot be obtained at less than 0.01 weight % while precipitation in the cooled state will result at over 0.70 weight %, and it is more preferably 0.01-0.30 weight %.

Further, in this invention, a mono-functional monomer may be utilized as a cationic polymerizable compound. The mono-functional monomer is preferably utilized at least 10 weight % with respect to improved ejection stability, and at most 30 weight % with respect to excellent curing capability and improvement of image quality such as reduced color bleeding.

Specific examples of the mono-functional monomer include the following, however, they are not limited thereto. Examples of the cationic polymerizable mono-functional monomer include oxetane compounds OXT211, OXT212, OXT101 and OXT213, manufactured by Toa Gosei Co., Ltd.;

and epoxy compounds AOEX24 and AOEX68, manufactured by Daicel Chemical Industries, Ltd.

As a cationic polymerizable compound utilized for the active ray curable ink-jet ink of this invention, almost every epoxy compound well known in the art can be utilized, in addition to the above-described mono-functional epoxy monomer.

Epoxy compounds include the following aromatic epoxide, alicyclic epoxide and aliphatic epoxide.

An aromatic epoxide is preferably di- or poly-glycidyl ether manufactured via a reaction of polyhydric phenol, which has at least one aromatic nuclei, or an alkylene oxide adduct thereof with epichlorohydrin, and includes such as di- or poly-glycidyl ether of bisphenol A or an alkylene oxide adduct thereof, di- or poly-glycidyl ether of hydrogenated bisphenol A or an alkylene oxide adduct thereof, and novolac type epoxy resin. Herein, an alkylene oxide includes such as ethylene oxide or propylene oxide.

An alicyclic epoxide is preferably a compound containing cyclohexene oxide or cyclopentene oxide which may be prepared by epoxidation of a compound having at least one cycloalkene ring such as a cyclohexene or a cyclopentene ring via use of a suitable oxidant such as hydrogen peroxide or peracid.

An aliphatic epoxy compound is preferably di- or poly-glycidyl ether of aliphatic polyhydric alcohol or an alkylene adduct thereof, typical examples of which include diglycidyl ether of alkylene glycol such as diglycidyl ether of ethylene glycol; diglycidyl ether of propylene glycol or diglycidyl ether of 1,6-hexanediol; polyglycidyl ether of polyhydric alcohol such as di- or tri-glycidyl ether of glycerin or alkylene oxide adduct thereof; and diglycidyl ether of polyalkylene glycol such as diglycidyl ether of polyethylene glycol or an alkylene oxide adduct thereof; and diglycidyl ether of polypropylene glycol or an alkylene oxide adduct thereof. Herein, alkylene oxide includes ethylene oxide and propylene oxide.

Among these epoxides, aromatic epoxide and alicyclic epoxide are preferable in consideration of its rapid drying property, of which alicyclic epoxides are specifically preferable. In this invention, one type of the above-described epoxides may be utilized alone; however, at least two types may be utilized in combination.

Almost every vinyl ether compound well known in the art may be utilized as a cationic polymerizable compound utilized for the active ray curable ink-jet ink of this invention.

For example, listed may be di- or tri-vinyl ether compounds such as ethylene glycol divinyl ether, diethylene glycol divinyl ether, triethylene glycol divinyl ether, propylene glycol divinyl ether, dipropylene glycol divinyl ether, butane diol divinyl ether, hexane diol divinyl ether, cyclohexane dimethanol divinyl ether, and trimethylolpropane trivinyl ether; as well as monovinyl ether compounds such as ethyl vinyl ether, butyl vinyl ether, i-butyl vinyl ether, octadecyl vinyl ether, cyclohexyl vinyl ether, hydroxybutyl vinyl ether, 2-ethylhexyl vinyl ether, cyclohexane dimethanol monovinyl ether, propyl vinyl ether, i-propyl vinyl ether, i-propenyl ether-O-propylene carbonate, dodecyl vinyl ether, diethylene glycol monovinyl ether, and octadecyl vinyl ether.

Among these vinyl ether compounds, a di- or tri-vinyl ether compound is preferable of which the divinyl ether compound is specifically preferable, in consideration of curing capability, adhesion and surface hardness.

Almost every oxetane compound well known in the art, in addition to the above-described mono-functional oxetane monomer, may be utilized as a cationic polymerizable compound utilized for the active ray curable ink-jet ink of this invention. Utilizable oxetane compounds include every oxetane compound well known in the art such as those disclosed in JP-A Nos. 2001-220526 and 2001-310937.

As a photo acid generating compound in this invention, photo acid generating compounds well known in the art, which are described in such as "Application and Market of UV•EB Curing Technologies" (CMC Publishing Co., Ltd., supervised by Yoneho Tabata/edited by Rad Tech Japan) may be utilized. As a photo acid generating compound, for example, a compound utilized in chemical amplification type photoresists and photo-induced cationic polymerization, [refer to p. 187-192 of "Organic Materials for Imaging", edited by Organic Electronics Material Study Group, published by Bun-Shin Shuppan, (1993)] may be employed. Preferable compounds applicable in this invention will be listed below.

Firstly, listed are $B(C_6F_6)_4^-$, $PF_6^-$, $AsF_6^-$, $SbF_6^-$ and $CF_3SO_3^-$ salt of an aromatic onium compound such as diazonium, ammonium, iodonium, sulfonium and phosphonium.

In the following, specific examples of an onium compound utilizable in this invention will be cited.

Secondly, listed is sulfonide which generates sulfonic acid, and specific examples thereof will be shown below.

Fourthly, listed is an iron allene complex.

A preferable addition amount of a photo acid generating compound is 1-6 weight % of the total ink and preferably 2-5 weight %.

Active ray curable ink-jet ink of this invention contains various types of dye and/or pigment well known in the art, however, preferably contains pigment.

Pigment preferably utilized in this invention will be listed below.

C. I. Pigment Yellow-1, 2, 3, 12, 13, 14, 16, 17, 73, 74, 75, 81, 83, 87, 93, 95, 97, 98, 109, 114, 120, 128, 129, 138, 150, 151, 154, 180, and 185;

C. I. Pigment Red-5, 7, 22, 38, 48:1, 48:2, 48:4, 49:1, 53:1, 57:1, 63:1, 101, 112, 122, 123, 144, 146, 168, 184, 185, and 202;

C. I. Pigment Violet-19, and 23;

C. I. Pigment Blue-1, 2, 3, 15:1, 15:2, 15:3, 15:4, 18, 22, 27, 29, and 60;

C. I. Pigment Green-7, and 36;

C. I. Pigment White-6, 18, and 21; and

C. I. Pigment Black-7.

Further, in this invention, white ink is preferably utilized to increase covering power of color on a transparent substrate such as plastic film. White ink is preferably utilized particularly in soft package printing and label printing.

Thirdly, also utilized can be halogenide which generates hydrogen halogenide and specific examples thereof will be shown below.

For dispersion of the above-described pigment, utilized can be, for example, a ball mill, a sand mill, an atliter, a roll mill, an agitator, a Henschel mixer, a colloid mill, an ultrasonic homogenizer, a pearl mill, a wet type jet mill and a paint shaker. Further, at the time of dispersing pigment, a dispersing agent may be added. As a dispersing agent, a polymer dispersing agent is preferably employed and a polymer dispersing agent includes Solsperse series by Avecia Corp. and PB series by Ajinomoto Fine Techno Corp. Further, as a dispersion aid, a synergist corresponding to various types of pigment may be utilized. These dispersing agent and dispersion aid are preferably incorporated at 1-50 weight parts against 100 weight parts of pigment.

A solvent or a cationic polymerizable compound is utilized as a dispersion medium; however, it is preferable to utilize no solvent since reaction and curing are performed after printing of photo-curable ink of this invention. When a solvent remains in a cured image, there cause problems of deterioration of solvent resistance and VOC (volatile organic compound) of the residual solvent. Therefore, as a dispersion medium, it is preferable to utilize no solvent but a cationic polymerizable compound, and more preferable to select monomer having the lowest viscosity among them, with respect to dispersion adaptability.

In pigment dispersion, selection of pigment, a dispersing agent and a dispersion medium, dispersion conditions and filtering conditions are suitably set so as to make a mean particle size of pigment particles of preferably 0.08-0.2 µm, and the maximum particle size of 0.3-10 µm and preferably of 0.3-3 µm. It is possible to restrain nozzle clogging as well as to maintain storage stability, transparency and curing sensitivity of ink by this particle size control.

In the active ray curable ink-jet ink of this invention, a concentration of a colorant is preferably 1-10 weights of the whole ink.

In the active ray curable ink-jet ink of this invention, viscosity at 25° C. is preferably 7-100 mPa·s with respect to obtaining good curing capability. Viscosity in this invention refers to a value at a share rate of 1,000 (1/s) measured by Visco-elastometer MCR 300, manufactured by Physics Corp.

In the following, an image forming method of this invention will be explained.

In an image forming method of this invention, preferable is a method in which the above described ink is ejected and drawn onto an ink-jet recording medium by means of an ink-jet recording method and the ink is successively cured by irradiation of active rays such as ultraviolet rays.

(Total Ink Layer Thickness after Ink Deposition)

In this invention, the total ink layer thickness after ink has been drawn on a recording medium followed by being cured by irradiation of active rays is preferably 2-20 µm. The total ink layer thickness is over 20 µm at present in an active ray curable ink-jet ink for a screen printing application; however, in an application to soft package printing, in which a recording medium is usually comprised of a thin plastic film material, ink ejection of an excess layer thickness is undesirable because, in addition to the above-described problem of curl and wrinkle of a recording medium, problems of changes of stiffness and texture of the total printed matter are caused.

Herein, "the total ink layer thickness" means the maximum value of a layer thickness of ink having been drawn on a recording medium, and the meaning of the total ink layer thickness is the same in any recording by means of an ink-jet recording method of mono-color, two-color accumulation (secondary color), three-color accumulation or four-color accumulation (white ink base).

(Ink Ejection Condition)

In image formation utilizing the active ray curable ink-jet ink of this invention, as an ink ejection condition, ejection is preferably performed while a recording head and the ink are heated at 35-100° C. with respect to ejection stability. Since the active ray curable ink-jet ink exhibits a large viscosity variation width due to temperature variation, the viscosity variation itself significantly influences a liquid drop size and a liquid drop ejection speed resulting in deterioration of image quality, and thus it is necessary to maintain ink temperature constant while raising the ink temperature. The control range of ink temperature is preferably a set temperature ±5° C., more preferably a set temperature ±2° C., and still more preferably a set temperature ±1° C.

(Light Irradiation Condition after Ink Deposition)

In an image forming method of this invention, as an irradiation condition of active rays, active rays are irradiated preferably within 0.001-1.0 second after ink deposition, and more preferably within 0.001-0.5 seconds. To form an image having high precision, it is specifically important that the irradiation timing is as fast as possible.

As an irradiation method of active rays, the basic method is disclosed in JP-A 60-132767. According to this patent, light sources are arranged on both sides of a head unit, and the head and light sources are scanned in a shuttle mode. Irradiation is performed after a predetermined time after ink deposition. Further, curing is completed by another light source without drive. In U.S. Pat. No. 6,145,979, as an irradiation method, disclosed are a method to utilize an optical fiber, and a method in which a collimated light source is incident in a mirror arranged on the side plane of a head unit and UV light is irradiated on the recoded portion. Any of these irradiation methods can be employed in an image forming method of this invention.

Next, an ink-jet recording apparatus (hereinafter, simply referred to as a recording apparatus) of this invention will be explained.

In the following, a recording apparatus of this invention will be explained appropriately referring to the drawings. Herein, a recording apparatus of the drawings is only an embodiment of a recording apparatus of this invention, and the recording apparatus of this invention is not limited to the drawings.

Figure 1:
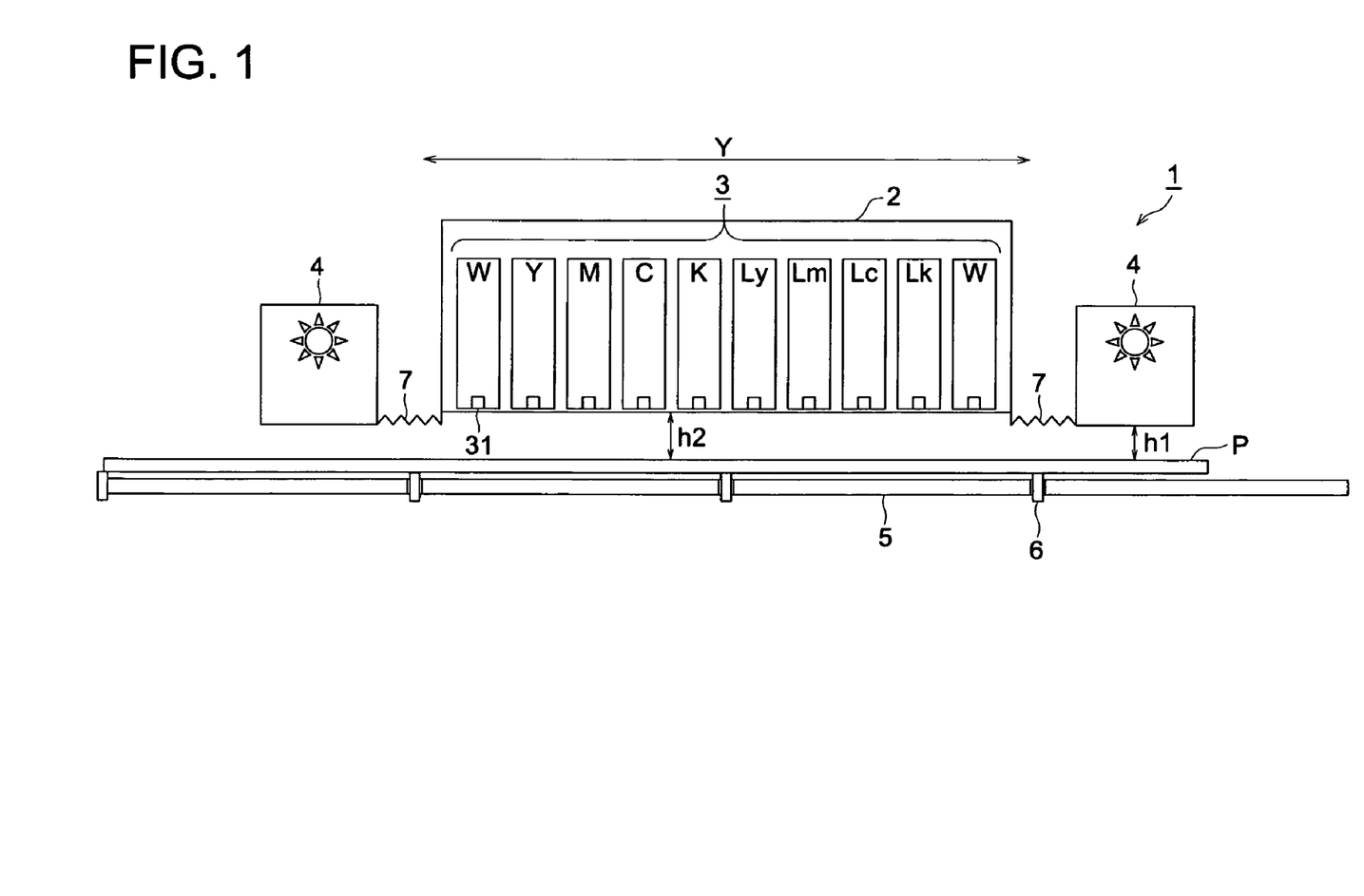
FIG. 1 is a front view drawing showing an example of a constitution of the primary portion of an ink-jet recording apparatus utilizable in this invention.

FIG. 1 is a front view showing a constitution of the primary portion of a recording apparatus of this invention. Recording apparatus 1 is constituted of such as head carriage 2, recording head 3, irradiation means 4 and platen portion 5. In this recording apparatus 1, platen portion 5 is arranged below recording medium P. Platen portion 5 functions to absorb ultraviolet rays and absorbs excess ultraviolet rays having passed through recording medium P. As a result, an image having high precision can be reproduced very stably.

Recording medium P is guided by guide member 6 and conveyed from this side to the interior of FIG. 1 via operation of a conveying means (not shown in the drawing). A head scanning means (also not shown in the drawing) performs scanning of recording head 3 mounted on head carriage 2 by shifting head carriage 2 back and forth in direction Y in FIG. 1.

Head carriage 2 is arranged above recording medium P and stores plural numbers of recording heads 3, in which the ejection outlet face downward, which will be described later, corresponding to the number of colors utilized in image printing on recording medium P. Head carriage 2 is so arranged as to be freely shiftable back and forth in direction Y in FIG. 1 of the recording apparatus 1 main body, and is shifted back and forth in direction Y in FIG. 1 via drive of the head scanning means.

Herein, in FIG. 1, head carriage 2 is drawn so as to accommodate recording heads 3 of white (W), yellow (Y), magenta (M), cyan (C), black (K), light yellow (Ly), light magenta (Lm), light cyan (Lc), light black (Lk), and white (W), however, in practice, the number of colors of recording heads 3 accommodated on head carriage 2 may be appropriately determined.

Recording head 3 ejects an active ray curable ink (such as an ultraviolet ray curable ink) supplied from an ink supply means (not shown in the drawing) onto recording medium P from an ejection orifice via operation of an ejection means (also not shown in the drawing), plural numbers of which are arranged in the interior. The UV ink ejected from recording head 3 is comprised of such as a colorant, a polymerizable monomer and an initiator, and is capable of being cured via cross-linking and/or polymerization reactions in conjunction with catalytic action of an initiator during irradiation of ultraviolet rays.

Recording heads 3 eject the UV ink as ink drops within a predetermined region (being the region designated for deposition) on recording medium P during scanning while shifted from one end of recording medium P to the other end of recording medium P along direction Y in FIG. 1 which driven by the head scanning means, whereby ink drops are deposited within the designated region.

After the above-described scanning is performed for the designated times to eject the UV ink onto one of the regions assigned for deposition, recording medium P is appropriately conveyed from this side toward the interior in FIG. 1 via a conveying means, and the UV ink is ejected onto the subsequent assigned for deposition adjacent to the above-described region in FIG. 1 by recording head 3 while again being scanned by the head scanning means.

By repeating the above-described operations to eject the UV ink from recording head 3 synchronously with the head scanning means and conveying means, an image comprising aggregates of UV ink drops is formed on recording medium P.

Irradiation means 4 is constituted of an ultraviolet lamp, which emits ultraviolet rays of a specific wavelength range at stable exposure energy, and a filter, which allows transmission of ultraviolet rays of only a specific wavelength range. Herein, as an ultraviolet lamp, appropriate are such as a mercury lamp, a metal halide lamp, an electrodeless lamp, an excimer laser, an ultraviolet laser, a cold cathode tube, a black light and an LED (Light Emitting Diode).

Irradiation means 4 is provided with a form approximately the same size as the maximum region which can be set by recording apparatus (UV ink-jet printer) 1, among a region capable of being deposited by the UV ink ejected from recording head 3 in one time scan by drive of a head scanning means, or larger than the region capable of being deposited.

Irradiation means 4, on both sides of head carriage 2, is installed to be nearly parallel to recording medium P.

As described above, as a means to adjust illuminance upon the ink ejection portion, the whole of recording head 3 is naturally light shielded; in addition to this, it is effective to set distance h2 between ink ejection portion 31 of recording head 3 and recording medium P to be greater than distance h1 between irradiation means 4 and recording medium P (h1<h2), or to make distance d between recording head 3 and irradiation means 4 greater (namely, making d large). Further, it is more preferable to provide bellows structure 7 between recording head 3 and irradiation means 4.

Herein, the wavelength of ultraviolet rays irradiated by irradiation means 4 can be varied as appropriate by changing the ultraviolet lamp or the filter, which is arranged in irradiation means 4.

The active ray curable ink-jet ink of this invention is excellent in ejection stability and is specifically effective in the case of image formation via use of a line head method recording apparatus.

Figure 2:
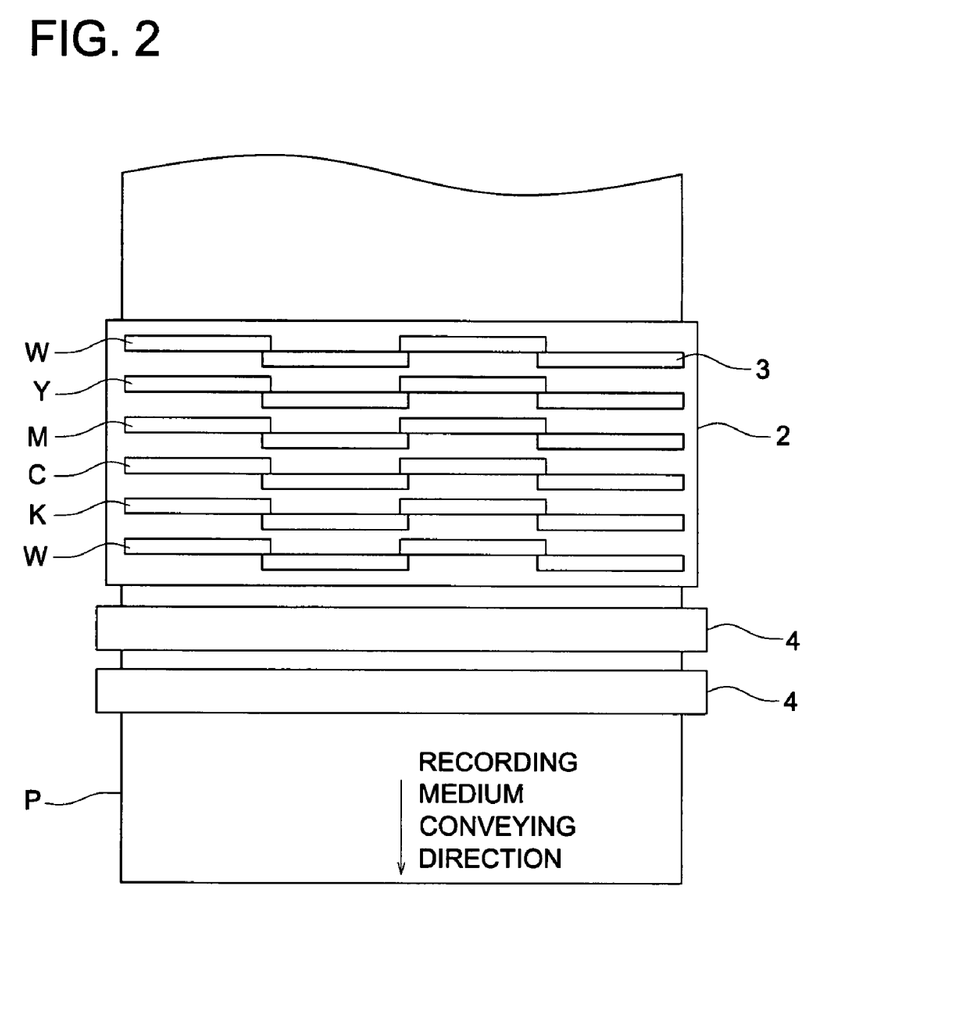
FIG. 2 is an over-view drawing showing another example of a constitution of the primary portion of an ink-jet recording apparatus of a line head method utilizable in this invention.

FIG. 2 is an over view showing another example of a constitution of the primary portion of this ink-jet recording apparatus. The ink-jet recording apparatus shown in FIG. 2 is called as a line head method, and plural sets of recording head 3 of each color are installed in head carriage 2 so as to cover the entire width of recording medium P. On the other hand, downstream of head carriage 2, irradiation means 4 is arranged similarly so as to cover the entire width of recording medium P.

In this line head method, head carriage 2 and irradiation means 4 are fixed, and only recording medium P is conveyed to form an image via ink ejection and curing.

EXAMPLES

In the following paragraphs, this invention will be explained with specific reference to examples; however, embodiments of this invention are not limited to these examples. Herein, "part(s)" or "%" in examples represents "weight part(s)" or "weight %", unless otherwise noted.

Example 1

Preparation of Fatty Acid Amine Salt

The amounts shown in Table 1 of fatty acid and amine shown in Table 1 were mixed and stirred to prepare various fatty acid amine salt of A-G.

TABLE 1

| | Fatty acid | | Amine | | |
|---|---|---|---|---|---|
| | Type | Amount (g) | Type | Amount (g) | Remarks |
| A | Butanoic acid | 22 | Dimethylethanolamine | 22 | Comparison |
| B | Caprylic acid | 36 | Octylamine | 32 | Invention |
| C | Lauric acid | 50 | Dimethylethanolamine | 22 | Invention |
| D | Sebacic acid | 33 | Diethanolamine | 37 | Invention |
| E | Sebacic acid | 33 | Triethanolamine | 52 | Invention |
| F | Oleic acid | 51 | Diethanolamine | 26 | Invention |
| G | Oleic acid | 71 | Dimethyldecylamine | 46 | Invention |

<Preparation of Dispersion>

Pigment was dispersed according to the following composition.

The following two compounds were charged in a stainless beaker and dissolved with stirring for 1 hour while being heated on a hot plate of 65° C.

| | |
|---|---|
| PB 822 (a dispersing agent manufactured by Ajinomoto Finetechno Corp.) | 9 parts |
| OXT-221 (manufactured by Toa Gosei Co., Ltd.) | 71 parts |

The solution, after having been cooled to room temperature, was added with 20 parts of the following pigment, which was charged in a glass bottle together with 200 g of zirconia beads having a diameter of 0.5 mm to be sealed, followed by being subjected to a dispersion process by a paint shaker for hours described below, and then zirconia beads were removed.

| | |
|---|---|
| Pigment 1: Pigment Black 7 (#52, produced by Mitsubishi Chemical Co., Ltd.) | 10 hours |
| Pigment 2: Pigment Blue 15:4 (Blue No. 32, produced by Dainichiseika Color & Chemicals Mfg. Co., Ltd.) | 9 hours |
| Pigment 3: Pigment Yellow 150 (E4GN-GT CH20015, produced by Lanxess Corp.) | 8 hours |
| Pigment 4: Pigment Red 122 (CFR-321, produced by Dainichiseika Color & Chemicals Mfg. Co., Ltd.) | 10 hours |
| Pigment 5: Titanium oxide (anatase type: particle size of 0.2 μm) | 10 hours |

<Preparation of Ink Set>

Utilizing each pigment dispersion prepared above, ink sets 1-11 comprising each color ink containing additives described in Tables 2-12 were prepared. Herein, each color ink, after having been added with additives described in the table was filtered through a Teflon (registered trade mark) membrane filter of 3 μm, produced by Advantec Co., Ltd. Viscosity of each ink is shown in the tables.

TABLE 2

Ink set 1 (comparison) Viscosity of each color: 17-21 mPa·s (at 25° C.)

| | | K | C | M | Y | W | Lk | Lc | Lm | Ly |
|---|---|---|---|---|---|---|---|---|---|---|
| Pigment | | 1 | 2 | 4 | 3 | 5 | 1 | 2 | 4 | 3 |
| Dispersion | | 12.5 | 12.5 | 21.0 | 15.0 | 40.0 | 3.1 | 3.1 | 5.3 | 3.8 |
| Cationic polymerizable compound (alicyclic epoxy compound, bi-functional) | Celloxide 3000 | 32.5 | 33.5 | 34.5 | 35.5 | 25.0 | 37.5 | 38.5 | 39.5 | 40.5 |
| Cationic polymerizable compound (oxetane compound, bi-functional) | OXT-221 | 49.0 | 48.0 | 38.5 | 43.5 | 29.0 | 55.3 | 54.3 | 51.2 | 51.7 |
| Exemplary fatty acid amine salt | A | 0.05 | 0.05 | 0.05 | 0.05 | 0.05 | 0.05 | 0.05 | 0.05 | 0.05 |
| Photo acid generating compound | UVI6992 | 5.0 | 5.0 | 5.0 | 5.0 | 5.0 | 3.0 | 3.0 | 3.0 | 3.0 |
| Sensitizer | DBA | 1.0 | 1.0 | 1.0 | 1.0 | 1.0 | 1.0 | 1.0 | 1.0 | 1.0 |

TABLE 3

Ink set 2 (invention) Viscosity of each color: 17-21 mPa·s (at 25° C.)

| | | K | C | M | Y | W | Lk | Lc | Lm | Ly |
|---|---|---|---|---|---|---|---|---|---|---|
| Pigment | | 1 | 2 | 4 | 3 | 5 | 1 | 2 | 4 | 3 |
| Dispersion | | 12.5 | 12.5 | 21.0 | 15.0 | 40.0 | 3.1 | 3.1 | 5.3 | 3.8 |
| Cationic polymerizable compound (alicyclic epoxy compound, bi-functional) | Celloxide 3000 | 32.5 | 33.5 | 34.5 | 35.5 | 25.0 | 37.5 | 38.5 | 39.5 | 40.5 |
| Cationic polymerizable compound (oxetane compound, bi-functional) | OXT-221 | 49.0 | 48.0 | 38.5 | 43.5 | 29.0 | 55.3 | 54.3 | 51.2 | 51.7 |
| Exemplary fatty acid amine salt | B | 0.05 | 0.05 | 0.05 | 0.05 | 0.05 | 0.05 | 0.05 | 0.05 | 0.05 |
| Photo acid generating compound | UVI6992 | 5.0 | 5.0 | 5.0 | 5.0 | 5.0 | 3.0 | 3.0 | 3.0 | 3.0 |
| Sensitizer | DBA | 1.0 | 1.0 | 1.0 | 1.0 | 1.0 | 1.0 | 1.0 | 1.0 | 1.0 |

TABLE 4

Ink set 3 (invention) Viscosity of each color: 35-38 mPa·s (at 25° C.)

| | | K | C | M | Y | W | Lk | Lc | Lm | Ly |
|---|---|---|---|---|---|---|---|---|---|---|
| Pigment | | 1 | 2 | 4 | 3 | 5 | 1 | 2 | 4 | 3 |
| Dispersion | | 12.5 | 12.5 | 21.0 | 15.0 | 40.0 | 3.1 | 3.1 | 5.3 | 3.8 |
| Cationic polymerizable compound (alicyclic epoxy compound, bi-functional) | Celloxide 3000 | 25.0 | 25.0 | 25.0 | 25.0 | 18.0 | 25.0 | 25.0 | 25.0 | 25.0 |
| Cationic polymerizable compound (oxetane compound, bi-functional) | OXT221 | 56.3 | 56.3 | 47.8 | 53.8 | 35.8 | 65.7 | 65.7 | 63.6 | 65.1 |

TABLE 4-continued

Ink set 3 (invention) Viscosity of each color: 35-38 mPa·s (at 25° C.)

| | | K | C | M | Y | W | Lk | Lc | Lm | Ly |
|---|---|---|---|---|---|---|---|---|---|---|
| Surfactant | KF-351 | 0.10 | 0.10 | 0.10 | 0.10 | 0.10 | 0.10 | 0.10 | 0.10 | 0.10 |
| Exemplary fatty acid amine salt | E | 0.10 | 0.10 | 0.10 | 0.10 | 0.10 | 0.10 | 0.10 | 0.10 | 0.10 |
| Photo acid generating compound | UVI6992 | 5.0 | 5.0 | 5.0 | 5.0 | 5.0 | 5.0 | 5.0 | 5.0 | 5.0 |
| Sensitizer | DBA | 1.0 | 1.0 | 1.0 | 1.0 | 1.0 | 1.0 | 1.0 | 1.0 | 1.0 |

TABLE 5

Ink set 4 (invention) Viscosity of each color: 30-33 mPa·s (at 25° C.)

| | | K | C | M | Y | W | Lk | Lc | Lm | Ly |
|---|---|---|---|---|---|---|---|---|---|---|
| Pigment | | 1 | 2 | 4 | 3 | 5 | 1 | 2 | 4 | 3 |
| Dispersion | | 12.5 | 12.5 | 21.0 | 15.0 | 40.0 | 3.1 | 3.1 | 5.3 | 3.8 |
| Cationic polymerizable compound (alicyclic epoxy compound, bi-functional) | EP-1 | 25.0 | 25.0 | 25.0 | 25.0 | 20.0 | 25.0 | 25.0 | 25.0 | 25.0 |
| Cationic polymerizable compound (oxetane compound, bi-functional) | OXT-221 | 40.3 | 40.8 | 32.3 | 38.3 | 25.8 | 48.2 | 48.2 | 46.1 | 47.6 |
| Cationic polymerizable compound (oxetane compound, mono-functional) | OXT-212 | 18.0 | 18.0 | 18.0 | 18.0 | 10.0 | 20.0 | 20.0 | 20.0 | 20.0 |
| Exemplary fatty acid amine salt | C | 0.10 | 0.10 | 0.10 | 0.10 | 0.10 | 0.10 | 0.10 | 0.10 | 0.10 |
| Surfactant | KF-352 | 0.10 | 0.10 | 0.10 | 0.10 | 0.10 | 0.10 | 0.10 | 0.10 | 0.10 |
| Photo acid generating compound | DTS-102 | 3.0 | 2.5 | 2.5 | 2.5 | 3.0 | 2.5 | 2.5 | 2.5 | 2.5 |
| Sensitizer | DBA | 1.0 | 1.0 | 1.0 | 1.0 | 1.0 | 1.0 | 1.0 | 1.0 | 1.0 |

TABLE 6

Ink set 5 (comparison) Viscosity of each color: 33-36 mPa·s (at 25° C.)

| | | K | C | M | Y | W |
|---|---|---|---|---|---|---|
| Pigment | | 1 | 2 | 4 | 3 | 5 |
| Dispersion | | 7.5 | 7.5 | 16.5 | 13.5 | 40.0 |
| Cationic polymerizable compound (alicyclic epoxy compound, bi-functional) | Celloxide 2021P | 30.0 | 30.0 | 30.0 | 30.0 | 20.0 |
| Cationic polymerizable compound (oxetane compound, bi-functional) | OXT-221 | 41.4 | 41.4 | 32.4 | 35.4 | 18.9 |
| Cationic polymerizable compound (oxetane compound, mono-functional) | OXT-101 | 5.0 | 5.0 | 5.0 | 5.0 | 5.0 |
| Cationic polymerizable compound (oxetane compound, mono-functional) | OXT-211 | 10.0 | 10.0 | 10.0 | 10.0 | 10.0 |
| Surfactant | X-22-4272 | 0.10 | 0.10 | 0.10 | 0.10 | 0.10 |
| Quaternary ammonium salt | N-1 | 1.00 | 1.00 | 1.00 | 1.00 | 1.00 |
| Photo acid generating compound | ESACURE1187 | 4.0 | 4.0 | 4.0 | 4.0 | 4.0 |
| Sensitizer | DBA | 1.0 | 1.0 | 1.0 | 1.0 | 1.0 |

TABLE 7

Ink set 6 (invention) Viscosity of each color: 33-36 mPa·s (at 25° C.)

| | | K | C | M | Y | W |
|---|---|---|---|---|---|---|
| Pigment | | 1 | 2 | 4 | 3 | 5 |
| Dispersion | | 7.5 | 7.5 | 16.5 | 13.5 | 40.0 |
| Cationic polymerizable compound (alicyclic epoxy compound, bi-functional) | Celloxide 2021P | 25.0 | 25.0 | 25.0 | 25.0 | 20.0 |
| Cationic polymerizable compound (oxetane compound, bi-functional) | OXT-221 | 47.3 | 47.3 | 38.3 | 41.3 | 23.8 |

TABLE 7-continued

Ink set 6 (invention) Viscosity of each color: 33-36 mPa·s (at 25° C.)

|  |  | K | C | M | Y | W |
|---|---|---|---|---|---|---|
| Cationic polymerizable compound (oxetane compound, mono-functional) | OXT-101 | 5.0 | 5.0 | 5.0 | 5.0 | 3.0 |
| Cationic polymerizable compound (oxetane compound, mono-functional) | OXT-211 | 10.0 | 10.0 | 10.0 | 10.0 | 8.0 |
| Surfactant | X-22-4272 | 0.10 | 0.10 | 0.10 | 0.10 | 0.10 |
| Exemplary fatty acid amine salt | G | 0.10 | 0.10 | 0.10 | 0.10 | 0.10 |
| Photo acid generating compound | ESACURE1187 | 4.0 | 4.0 | 4.0 | 4.0 | 4.0 |
| Sensitizer | DBA | 1.0 | 1.0 | 1.0 | 1.0 | 1.0 |

TABLE 8

Ink set 8 (invention) Viscosity of each color: 34-37 mPa·s (at 25° C.)

|  |  | K | C | M | Y | W |
|---|---|---|---|---|---|---|
| Pigment Dispersion |  | 1<br>7.5 | 2<br>7.5 | 4<br>16.5 | 3<br>13.5 | 5<br>40.0 |
| Cationic polymerizable compound (oxetane compound, bi-functional) | OXT-221 | 41.2 | 41.2 | 32.2 | 35.2 | 21.7 |
| Cationic polymerizable compound (oxetane compound, bi-functional) | RSOX | 10.0 | 10.0 | 10.0 | 10.0 | 7.0 |
| Cationic polymerizable compound (alicyclic epoxy compound, bi-functional) | EP-1 | 15.0 | 15.0 | 15.0 | 15.0 | 15.0 |
| Cationic polymerizable compound (mono-functional epoxy compound) | AOEX68 | 20.0 | 20.0 | 20.0 | 20.0 | 10.0 |
| Exemplary fatty acid amine salt | F | 0.10 | 0.10 | 0.10 | 0.10 | 0.10 |
| Surfactant | XF42-334 | 0.20 | 0.20 | 0.20 | 0.20 | 0.20 |
| Photo acid generating compound | ESACURE1187 | 5.0 | 5.0 | 5.0 | 5.0 | 5.0 |
| Sensitizer | DBA | 1.0 | 1.0 | 1.0 | 1.0 | 1.0 |

TABLE 9

Ink set 8 (invention) Viscosity of each color: 28-32 mPa·s (at 25° C.)

|  |  | K | C | M | Y | W |
|---|---|---|---|---|---|---|
| Pigment Dispersion |  | 2<br>12.5 | 3<br>12.5 | 5<br>21.0 | 4<br>15.0 | 6<br>40.0 |
| Exemplary fatty acid amine salt | D | 0.2 | 0.2 | 0.2 | 0.2 | 0.2 |
| Cationic polymerizable compound (alicyclic epoxy compound, bi-functional) | Celloxide 2021P | 20.0 | 20.0 | 20.0 | 20.0 | 15.0 |
| Cationic polymerizable compound (vinyl ether compound) | CHVE | 38.2 | 38.7 | 30.2 | 36.2 | 15.7 |
| Cationic polymerizable compound (vinyl ether compound) | DVE-3 | 10.0 | 10.0 | 10.0 | 10.0 | 10.0 |
| Cationic polymerizable compound (mono-functional epoxy compound) | AOEX68 | 15.0 | 15.0 | 15.0 | 15.0 | 15.0 |
| Surfactant | KF-352 | 0.10 | 0.10 | 0.10 | 0.10 | 0.10 |
| Photo acid generating compound | DTS-102 | 3.0 | 2.5 | 2.5 | 2.5 | 3.0 |
| Sensitizer | DBA | 1.0 | 1.0 | 1.0 | 1.0 | 1.0 |

TABLE 10

Ink set 9 (comparison) Viscosity of each color: 17-21 mPa·s (at 25° C.)

|  |  | K | C | M | Y | W | Lk | Lc | Lm | Ly |
|---|---|---|---|---|---|---|---|---|---|---|
| Pigment Dispersion |  | 1<br>12.5 | 2<br>12.5 | 4<br>21.0 | 3<br>15.0 | 5<br>40.0 | 1<br>3.1 | 2<br>3.1 | 4<br>5.3 | 3<br>3.8 |
| Polymerizable compound (alicyclic epoxy compound, bi-functional) | Celloxide 3000 | 32.5 | 33.5 | 34.5 | 35.5 | 25.0 | 37.5 | 38.5 | 39.5 | 40.5 |
| Polymerizable compound (oxetane compound, bi-functional) | OXT-221 | 49.0 | 48.0 | 38.5 | 43.5 | 29.0 | 55.4 | 54.4 | 51.3 | 51.8 |
| Exemplary fatty acid amine salt | — | 0.00 | 0.00 | 0.00 | 0.00 | 0.00 | 0.00 | 0.00 | 0.00 | 0.00 |
| Photo acid generating compound | UVI6992 | 5.0 | 5.0 | 5.0 | 5.0 | 5.0 | 3.0 | 3.0 | 3.0 | 3.0 |
| Sensitizer | DBA | 1.0 | 1.0 | 1.0 | 1.0 | 1.0 | 1.0 | 1.0 | 1.0 | 1.0 |

TABLE 11

Ink set 10 (comparison) Viscosity of each color: 17-21 mPa · s (at 25° C.)

|  |  | K | C | M | Y | W | Lk | Lc | Lm | Ly |
|---|---|---|---|---|---|---|---|---|---|---|
| Pigment | | 1 | 2 | 4 | 3 | 5 | 1 | 2 | 4 | 3 |
| Dispersion | | 12.5 | 12.5 | 21.0 | 15.0 | 40.0 | 3.1 | 3.1 | 5.3 | 3.8 |
| Polymerizable compound (alicyclic epoxy compound, bi-functional) | Celloxide 3000 | 32.5 | 33.5 | 34.5 | 35.5 | 25.0 | 37.5 | 38.5 | 39.5 | 40.5 |
| Polymerizable compound (oxetane compound, bi-functional) | OXT-221 | 48.1 | 47.1 | 37.6 | 42.6 | 28.1 | 54.5 | 53.5 | 50.4 | 50.9 |
| Exemplary fatty acid amine salt | D | 0.90 | 0.90 | 0.90 | 0.90 | 0.90 | 0.90 | 0.90 | 0.90 | 0.90 |
| Photo acid generating compound | UVI6992 | 5.0 | 5.0 | 5.0 | 5.0 | 5.0 | 3.0 | 3.0 | 3.0 | 3.0 |
| Sensitizer | DBA | 1.0 | 1.0 | 1.0 | 1.0 | 1.0 | 1.0 | 1.0 | 1.0 | 1.0 |

TABLE 12

Ink set 11 (invention) Viscosity of each color: 17-21 mPa · s (at 25° C.)

|  |  | K | C | M | Y | W | Lk | Lc | Lm | Ly |
|---|---|---|---|---|---|---|---|---|---|---|
| Pigment | | 1 | 2 | 4 | 3 | 5 | 1 | 2 | 4 | 3 |
| Dispersion | | 12.5 | 12.5 | 21.0 | 15.0 | 40.0 | 3.1 | 3.1 | 5.3 | 3.8 |
| Polymerizable compound (alicyclic epoxy compound, bi-functional) | Celloxide 3000 | 32.5 | 33.5 | 34.5 | 35.5 | 25.0 | 37.5 | 38.5 | 39.5 | 40.5 |
| Polymerizable compound (oxetane compound, bi-functional) | OXT-221 | 48.5 | 47.5 | 38.0 | 43.0 | 28.5 | 54.9 | 53.9 | 50.8 | 51.3 |
| Exemplary fatty acid amine salt | D | 0.50 | 0.50 | 0.50 | 0.50 | 0.50 | 0.50 | 0.50 | 0.50 | 0.50 |
| Photo acid generating compound | UVI6992 | 5.0 | 5.0 | 5.0 | 5.0 | 5.0 | 3.0 | 3.0 | 3.0 | 3.0 |
| Sensitizer | DBA | 1.0 | 1.0 | 1.0 | 1.0 | 1.0 | 1.0 | 1.0 | 1.0 | 1.0 |

Details of expression of each ink and each compound described in Tables 2-12 are as follows.
K: dark black ink
C: dark cyan ink
M: dark magenta ink
Y: dark yellow ink
W: white ink
Lk: light black ink
Lc: light cyan ink
Lm: light magenta ink
Ly: light yellow ink
[Cationic Polymerizable Compound]
(Epoxy Compound)
AOEX 68: produced by Daicel Chemical Industries, Ltd., low molecular weight epoxy compound
Celloxide 3000: produced by Daicel Chemical Industries, Ltd.
Celloxide 2021P: produced by Daicel Chemical Industries, Ltd.

(Oxetane Compound)
OXT-101: produced by Toa Gosei Co., Ltd.
OXT-211: produced by Toa Gosei Co., Ltd.
OXT-212: produced by Toa Gosei Co., Ltd.
OXT-221: produced by Toa Gosei Co., Ltd.
RSOX: produced by Toa Gosei Co., Ltd.
(Vinyl Ether Compound)
CHVE: produced by ISP Japan Ltd.
DVE-3: produced by ISP Japan Ltd.
[Photo Acid Generating Compound]
UV16992: produced by The Dow Chemical Co., a 50% propione carbonate solution
DTS-102: produced by Midori Kagaku Co., Ltd.
ESACURE1187: produced by Nihon SiberHegner K.K.
[Surfactant]
KF-351: produced by Shin-Etsu Silicone Co., Ltd.
KF-352: produced by Shin-Etsu Silicone Co., Ltd.
X-22-4272: produced by Shin-Etsu Silicone Co., Ltd.
XF42-334: produced by GE Toshiba Silicones Co., Ltd.
[Sensitizer]
DBA: produced by Kawasaki Kasei Chemicals Ltd.

Compound EP-1

Quaternary ammonium salt N-1

The ink having been sealed and stored was left alternately under conditions of 50° C. and −20° C. for 24 hour each to prepare a sample having been stored for 1 month, and following image formation was performed.

<Ink-Jet Image Forming Methods>

On an ink-jet recording apparatus equipped with a piezo type ink-jet nozzle and having a constitution described in FIG. 1, each ink composition set 1-4, 9-11 prepared above was mounted, and the following image recording was continuously performed on a long length PET roll of 600 mm wide and 500 m long, as described on Table 13. As an image data, "High precision color digital standard image data <N5•bycicle> (published by Foundation, Japanese Standards Association, December 1995)" was employed. An ink supply system is constituted of an ink tank, a supply pipe, a pre-room ink tank immediately before the head, piping equipped with a filter and a piezo head, and the portion from the pre-room tank till the head was heat insulated and heated at 50° C. The piezo head was driven so as to eject multi-size dots of 2-15 pl at a resolution of 720×720 dpi and continuously ejected each ink. The ink drops, after having been deposited, were cured in a moment (within less than 2 seconds after ink deposition) by lamp units on both sides of the carriage. The total ink layer thickness after recording was measured to be in a range of 2.3-20 μm. In this invention, dpi is a dot number per inch, namely 2.54 cm.

Next, an image was formed in a quite similar manner, utilizing ink sets 5-8, by use of an ink-jet recording apparatus of the line head recording method described in FIG. 2.

Herein, formation of an ink-jet image was performed according to the above-described method, under an environment of 10° C. and 20% RH, an environment of 25° C. and 50% RH and an environment of 27° C. and 80% RH, respectively.

<Irradiation Light Source>

Light source 1: High pressure mercury lamp VZero 085 (manufactured by Integration Technology Ltd.)

Light source 2: 120 W/cm metal halide lamp MAL 400NL (manufactured by Japan Storage Battery Co., Ltd.)

<Irradiation Method of Light Source>

Method 1: Irradiation from both sides of a recording head (FIG. 1)

Method 2: Irradiation downstream in the recording medium conveying direction by linear light source (FIG. 2)

Herein, illuminance described in Table 13 was measured at 254 nm by use of UVPF-A1 (manufactured by Iwasaki Electric Co., Ltd.).

TABLE 13

| Sample No. | Ink set No. | Storage | Recording medium | Irradiation conditions | | | | Remarks |
|---|---|---|---|---|---|---|---|---|
| | | | | Irradiation Light source | Irradiation timing | Irradiation method | Illuminance on recording medium surface | |
| 1 | 1 | *1 | PET | Light source 1 | *3 | Method 1 | 400 mW/cm² | Comparison |
| 2 | 1 | *2 | PET | Light source 1 | *3 | Method 1 | 400 mW/cm² | Comparison |
| 3 | 2 | *1 | PET | Light source 1 | *3 | Method 1 | 400 mW/cm² | Invention |
| 4 | 2 | *2 | PET | Light source 1 | *3 | Method 1 | 400 mW/cm² | Invention |
| 5 | 3 | *1 | PET | Light source 1 | *3 | Method 1 | 400 mW/cm² | Invention |
| 6 | 3 | *2 | PET | Light source 1 | *3 | Method 1 | 400 mW/cm² | Invention |
| 7 | 4 | *1 | PET | Light source 1 | *3 | Method 1 | 400 mW/cm² | Invention |
| 8 | 4 | *2 | PET | Light source 1 | *3 | Method 1 | 400 mW/cm² | Invention |
| 9 | 5 | *1 | PET | Light source 2 | *3 | Method 2 | 600 mW/cm² | Comparison |
| 10 | 5 | *2 | PET | Light source 2 | *3 | Method 2 | 600 mW/cm² | Comparison |
| 11 | 6 | *1 | PET | Light source 2 | *3 | Method 2 | 600 mW/cm² | Invention |
| 12 | 6 | *2 | PET | Light source 2 | *3 | Method 2 | 600 mW/cm² | Invention |
| 13 | 7 | *1 | PET | Light source 2 | *3 | Method 2 | 600 mW/cm² | Invention |
| 14 | 7 | *2 | PET | Light source 2 | *3 | Method 2 | 600 mW/cm² | Invention |
| 15 | 8 | *1 | PET | Light source 2 | *3 | Method 2 | 600 mW/cm² | Invention |
| 16 | 8 | *2 | PET | Light source 2 | *3 | Method 2 | 600 mW/cm² | Invention |
| 17 | 9 | *1 | PET | Light source 1 | *3 | Method 1 | 400 mW/cm² | Comparison |
| 18 | 9 | *2 | PET | Light source 1 | *3 | Method 1 | 400 mW/cm² | Comparison |
| 19 | 10 | *1 | PET | Light source 1 | *3 | Method 1 | 400 mW/cm² | Comparison |
| 20 | 10 | *2 | PET | Light source 1 | *3 | Method 1 | 400 mW/cm² | Comparison |
| 21 | 11 | *1 | PET | Light source 1 | *3 | Method 1 | 400 mW/cm² | Invention |
| 22 | 11 | *2 | PET | Light source 1 | *3 | Method 1 | 400 mW/cm² | Invention |

*1: Without storage (evaluation immediately after preparation),
*2: −20° C., 50° C. for 1 month,
*3: 0.1 second after ink deposition <Evaluation of Ink-jet Recorded Image>

With respect to each image recorded by the above-described image forming method, each type of the following evaluations, as to whether an image could be stably formed, was performed every 10 meter of output.

(Quality of Text Character)

Utilizing each color ink of Y, M, C and K, MS-Ming style characters of 6 points were printed at a targeted density, and roughness of the character edges was evaluated via magnification with a loupe, whereby character quality was evaluated based on the following criteria. When an ink-jet nozzle was clogged or bent during ink ejection, quality of text characters was significantly deteriorated.

A: No roughness was noted.
B: Slight roughness was noted.
C: Some roughness was noted, however, characters could be recognized; which was judged to be a barely usable level.
D: Severe roughness was noted and characters were not distinct; which was considered unacceptable.

[Color Mixing (Bleeding and Wrinkling)]

Printing was conducted so that each dot of Y, M, C and K colors were adjacent to each other, and each color dot was magnified via a loupe to visually observe any state of bleeding, whereby color mixing was evaluated based on the following criteria. When an ink-jet nozzle was clogged or bent during ink ejection, color mixing became significant.

A: The shape of adjacent dots retained a true circle, indicating no bleeding.
   B: The shape of adjacent dots retained an almost true circle indicating hardly any bleeding.
   C: Adjacent dots showed slight bleeding and the dot shape was slightly deformed; which was judged to be barely viable level.
   D: Adjacent dots showed bleeding and were mixed with each other, and further wrinkling was generated at the mixed portions; which was judged to be a non-viable level.

<Physical Properties of Cured Ink Layer>

With respect to images prepared via the above-described image forming method, physical properties of cured layers were evaluated according to the following test method via use of a 10 cm$^2$ sample at a cured ink layer thickness of 20 μm.

(Pencil Scratch Hardness)

Hardness of each cured sample was measured according to a pencil scratch test (per JIS K5400). The ranking of pensile lead hardness was in the order of:
   (soft) 6B-B, HB, H-9H (hard)
where 6B is the softest and 9H is the hardest. The resistance to harder pencil lead scratching was more preferable.

provide more excellent characteristics. Further, it was clear that a cured layer formed under an environment of 25° C. and 50% RH was superior in abrasion resistance compared to the comparison examples.

What is claimed is:

1. An active ray curable ink-jet ink comprising at least one type of photo acid generating compound, a cationic polymerizable compound and a pigment,
   wherein the active ray curable ink-jet ink contains a fatty acid amine salt comprising a fatty acid having a carbon number of 6-18, and a primary, a secondary or a tertiary amine having a carbon number of 4-12, and wherein a content of the fatty acid amine salt is 0.01-0.50 weight % based on the total weight of the ink-jet ink.

2. The active ray curable ink-jet ink described in claim 1, wherein the fatty acid, having a carbon number of 6-18, is an unsaturated fatty acid having a carbon number of 6-18.

3. The active ray curable ink-jet ink described in claim 1, wherein the primary, the secondary or the tertiary amine, having a carbon number of 4-12, is a primary, a secondary or a tertiary alkanol amine having a carbon number of 4-12.

4. The active ray curable ink-jet ink described in claim 1, wherein the ink-jet ink contains at least one monomer, as the cationic polymerizable compound, selected from the group consisting of an epoxy compound, a vinyl ether compound and an oxetane compound, and further con-

TABLE 14

| Sample No. | 10° C. 20% RH | | | 25° C. 50% RH | | | 27° C. 80% RH | | | Remarks |
|---|---|---|---|---|---|---|---|---|---|---|
| | Quality of character | *1 | Pencil scratch hardness | Quality of character | *1 | Pencil scratch hardness | Quality of character | *1 | Pencil scratch hardness | |
| 1 | A | A | 3H | A | A | 3H | B | B | H | Comparison |
| 2 | D | B | 3H | D | D | 3H | D | D | 3H | Comparison |
| 3 | B | B | 2H | B | B | 2H | C | C | H | Invention |
| 4 | B | B | H | C | C | H | C | C | H | Invention |
| 5 | A | A | 3H | A | A | 3H | B | B | H | Invention |
| 6 | A | A | 3H | A | A | 3H | B | B | H | Invention |
| 7 | A | A | 2H | A | A | 2H | B | B | H | Invention |
| 8 | A | A | 2H | A | A | 2H | C | C | H | Invention |
| 9 | B | B | 2B | B | C | 2B | B | C | 4B | Comparison |
| 10 | D | D | 2B | D | D | 3B | D | D | 4B | Comparison |
| 11 | A | A | 5H | A | A | 5H | B | B | 3H | Invention |
| 12 | A | A | 5H | A | A | 5H | B | B | 3H | Invention |
| 13 | A | A | 4H | A | A | 4H | B | B | 2H | Invention |
| 14 | A | A | 4H | A | A | 4H | B | B | 2H | Invention |
| 15 | B | B | 2H | B | B | 2H | B | C | H | Invention |
| 16 | B | B | 2H | B | B | 2H | B | C | H | Invention |
| 17 | A | A | 4H | A | A | 4H | B | B | 3H | Comparison |
| 18 | D | D | 4H | D | D | 4H | D | D | 3H | Comparison |
| 19 | B | B | 2B | C | C | 3B | D | D | 5B | Comparison |
| 20 | D | D | 2B | D | D | 3B | D | D | 5B | Comparison |
| 21 | B | B | 2H | B | B | 2H | C | C | H | Invention |
| 22 | B | B | 2H | B | B | 2H | C | C | H | Invention |

*1: Color mixing (bleeding, wrinkle)

It is clear from Table 14 that ink sets according to this invention, compared to comparison ink sets, showed no variation in quality of text characters and exhibited resistance to color mixing even when printing was performed in varying temperature and humidity environments, and were judged to tains at least one type of mono-functional monomer in an amount of 10-30 weight % based on the total weight of the ink-jet ink.

5. The active ray curable ink-jet ink described in claim 1, wherein viscosity of the ink-jet ink at 25° C. is 7-100 mPa·s.

6. An image forming method comprising the steps of:
(i) ejecting the active ray curable ink-jet ink described in claim 1 onto a recording medium from an ink-jet recording head, and
(ii) curing the ejected ink-jet ink to form an image on the recording medium,
wherein the image is formed by ejecting the active ray curable ink-jet ink from a recording head of a line head method.

7. An ink-jet recording apparatus to perform image formation utilizing the active ray curable ink-jet ink described in claim 1,
wherein ink ejection is performed after the active ray curable ink-jet ink and a recording head are heated to 35-100° C.

* * * * *